United States Patent
Fleury et al.

(10) Patent No.: US 12,479,942 B2
(45) Date of Patent: Nov. 25, 2025

(54) METHOD FOR PRODUCING A RUBBER COMPOSITION

(71) Applicant: COMPAGNIE GENERALE DES ETABLISSEMENTS MICHELIN, Clermont-Ferrand (FR)

(72) Inventors: Etienne Fleury, Clermont-Ferrand (FR); Julien Cladiere, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 593 days.

(21) Appl. No.: 17/910,449

(22) PCT Filed: Mar. 9, 2021

(86) PCT No.: PCT/FR2021/050395
§ 371 (c)(1),
(2) Date: Sep. 9, 2022

(87) PCT Pub. No.: WO2021/181040
PCT Pub. Date: Sep. 16, 2021

(65) Prior Publication Data
US 2023/0128470 A1    Apr. 27, 2023

(30) Foreign Application Priority Data
Mar. 10, 2020 (FR) ...................... 2002364

(51) Int. Cl.
| | |
|---|---|
| *C08F 236/06* | (2006.01) |
| *C08F 210/02* | (2006.01) |
| *C08K 3/04* | (2006.01) |
| *C08K 3/06* | (2006.01) |
| *C08K 5/31* | (2006.01) |
| *C08K 5/372* | (2006.01) |
| *C08K 5/44* | (2006.01) |

(52) U.S. Cl.
CPC .......... *C08F 236/06* (2013.01); *C08F 210/02* (2013.01); *C08K 3/04* (2013.01); *C08K 3/06* (2013.01); *C08K 5/31* (2013.01); *C08K 5/3725* (2013.01); *C08K 5/44* (2013.01)

(58) Field of Classification Search
None
See application file for complete search history.

(56) References Cited

U.S. PATENT DOCUMENTS

| 5,616,279 A * | 4/1997 | D'Sidocky ............... C08K 5/47 |
| | | 252/182.17 |
| 2004/0092648 A1* | 5/2004 | Jones ...................... C08L 23/22 |
| | | 524/502 |
| 2018/0371214 A1* | 12/2018 | Thuilliez ............... C08F 210/02 |

FOREIGN PATENT DOCUMENTS

| CN | 110218274 A | 9/2019 |
| WO | 2019110924 A1 | 6/2019 |

OTHER PUBLICATIONS

International Search Report and Written Opinion with English translation mailed Jun. 30, 2021 for International Application No. PCT/FR2021/050395, 11 pages.
Thomson Scientific, London, GB, vol. 2019, No. 80, AN 2019-79555M, retrieved from Database WPI, XP002801109, CN 110218274 A for Changchun Applied Chem. Inst. Chinese Acad., 5 pages.

* cited by examiner

*Primary Examiner* — Katarzyna I Kolb
(74) *Attorney, Agent, or Firm* — Dickinson Wright PLLC

(57) ABSTRACT

A process for manufacturing a rubber composition which comprises more than 50 phr of a diene elastomer rich in ethylene units, a reinforcing filler comprising a carbon black and a vulcanization system comprising sulfur, a sulfenamide as primary accelerator and a thiuram polysulfide or a mixture of a thiuram polysulfide and a guanidine as secondary accelerator is provided. The process comprises mixing the highly saturated diene elastomer, the reinforcing filler and the secondary accelerator by kneading at a temperature above 110° C., in the absence of the sulfur and the primary accelerator, and incorporating the sulfur and the primary accelerator into the rubber composition by kneading at a temperature below 110° C. The process makes it possible to reduce the hysteresis of the vulcanized rubber compositions.

20 Claims, No Drawings

METHOD FOR PRODUCING A RUBBER COMPOSITION

CROSS-REFERENCE TO RELATED APPLICATIONS

This U.S. national phase patent application claims priority to and the benefit of International Patent Application No. PCT/FR2021/050395, filed Mar. 9, 2021, which claims priority to and the benefit of French patent application no. FR2002364, filed Mar. 10, 2020, the contents of which are incorporated herein by reference in their entirety.

BACKGROUND

1. Technical Field

The field of the present invention is that of processes for manufacturing rubber compositions reinforced with carbon black and containing copolymers of conjugated dienes rich in ethylene units.

2. Related Art

It is known to crosslink the diene elastomers in a rubber composition to give the rubber composition the desired elasticity, stiffness and reinforcement properties depending on the application envisaged. It has therefore been customary for many years to vulcanize, that is to say crosslink under the action of sulfur, the diene elastomers in a rubber composition, in particular which is intended for use in a tire. The vulcanization reaction proceeds from a reaction between the diene units of the elastomer and a crosslinking system which comprises sulfur-based reagents.

Generally, vulcanization systems include, in addition to sulfur, at least one primary accelerator and one secondary accelerator. The combination of the primary accelerator and the secondary accelerator makes it possible to accelerate the vulcanization reaction of the diene rubber compositions, therefore to reduce the vulcanization time, which is advantageous in terms of industrial productivity. However, this acceleration of the vulcanization rate must not be accompanied by premature vulcanization (or scorching) of the composition. This phenomenon of premature vulcanization, if it occurs, is detrimental to the steps of preparing and shaping the rubber composition, in particular calendering or extrusion, steps which generally precede the step of vulcanizing the diene rubber composition. Indeed, scorching can lead to large increases in viscosity of the rubber compositions which then become much more difficult to work and to process industrially.

To avoid premature vulcanization, the sulfur and the primary and secondary accelerators are introduced into the rubber composition at a temperature well below the vulcanization temperature and their incorporation by kneading into the rubber composition is also carried out at a temperature below the vulcanization temperature. This is why the conventional processes for manufacturing diene rubber compositions comprise two successive preparation phases well known to those skilled in the art. The first is a step of thermomechanical kneading of the constituents of the rubber composition with the exception of the sulfur and the accelerators. The first step is carried out at high temperature, typically up to a maximum temperature above 110° C., preferably from 130° C. to 180° C. It is termed the working phase or non-productive phase. The second step, referred to as the productive phase, is carried out at lower temperature, typically below 110° C., for example between 40° C. and 100° C., during which finishing phase the vulcanization system is incorporated.

In the preparation of rubber compositions for tires, the most widely used diene elastomers are polybutadienes, polyisoprenes, in particular natural rubber, and copolymers of 1,3-butadiene and styrene. The point common to these elastomers is the high molar proportion of diene units in the elastomer since they generally contain more than 50 mol % of diene units. Moreover, this high proportion of diene units can make these elastomers rich in diene units sensitive to oxidation, in particular under the action of ozone. The applicant has described elastomers which, on the contrary, are relatively poor in diene units, in particular for the purpose of reducing their sensitivity to oxidation phenomena. These elastomers are, for example, described in the document WO 2007054223. They are copolymers of conjugated diene and ethylene containing more than 50 mol % of ethylene units. These elastomers are described as ethylene-rich diene elastomers.

Replacing the elastomers rich in diene units, in the rubber compositions for tires, with diene elastomers rich in ethylene units may be accompanied both by a reduction in hysteresis of the rubber composition and by an increase in the stiffness thereof, which is expressed by a modification of the performance compromise between the rolling resistance and the wear of the tire. Reference may for example be made to document WO 2014114607.

SUMMARY

The applicant, continuing its efforts to further reduce the hysteresis of rubber compositions based on conjugated diene elastomers rich in ethylene units, has discovered against all expectations that the introduction of a secondary accelerator into the rubber composition during the non-productive phase made it possible to reduce the hysteresis of the rubber composition without causing premature vulcanization.

Thus, the invention relates to a process for manufacturing a rubber composition which comprises a highly saturated diene elastomer, a reinforcing filler comprising a carbon black and a vulcanizing system comprising sulfur and a vulcanization accelerator,
  the highly saturated diene elastomer being a copolymer of ethylene and of a 1,3-diene containing ethylene units which represent at least 50 mol % of the monomer units of the copolymer,
  the content of the highly saturated diene elastomer in the rubber composition being greater than 50 phr,
  the vulcanization accelerator being a mixture of a primary accelerator and of a secondary accelerator,
the primary accelerator being a sulfenamide, the secondary accelerator being a thiuram polysulfide or a mixture of a thiuram polysulfide and a guanidine,
which process comprises a step a) followed by a step b):
  a) mixing the highly saturated diene elastomer, the reinforcing filler and the secondary accelerator by kneading at a temperature above 110° C., in the absence of the sulfur and the primary accelerator,
  b) incorporating the sulfur and the primary accelerator into the rubber composition by kneading at a temperature below 110° C.

DETAILED DESCRIPTION OF EXAMPLE EMBODIMENTS

Any interval of values denoted by the expression "between a and b" represents the range of values greater than "a" and less than "b" (that is to say, limits a and b excluded), whereas any interval of values denoted by the expression "from a to b" means the range of values extending from "a" up to "b" (that is to say, including the strict limits a and b). The abbreviation "phr" means parts by weight per hundred parts of elastomer (of the total of the elastomers if several elastomers are present).

The compounds mentioned in the description may be of fossil origin or may be biobased. In the latter case, they may be partially or totally derived from biomass or may be obtained from renewable starting materials derived from biomass. Polymers, plasticizers, fillers and the like are notably concerned.

In the present application, the expression "all of the monomer units of the elastomer" or "the total amount of the monomer units of the elastomer" means all the constituent repeating units of the elastomer which result from the insertion of the monomers into the elastomer chain by polymerization. Unless otherwise indicated, the contents of a monomer unit or repeating unit in the highly saturated diene elastomer are given as molar percentages calculated on the basis of all of the monomer units of the elastomer.

The process in accordance with the invention is a process for preparing a rubber composition. It has the essential characteristic of comprising two kneading steps, one in step a) and one in step b). Step a) of the process in accordance with the invention is a step during which the constituents of the rubber composition, with the exception of the sulfur and the primary accelerator, are mixed by kneading, in particular thermomechanical kneading. During step a), the elastomer, the reinforcing filler and the secondary accelerator are kneaded together, typically in a suitable mixer such as a standard internal mixer. The kneading temperature in step a) is above 110° C., preferentially between 110° C. and 190° C., advantageously above 130° C. and below 180° C. The temperature ranges between 110° C. and 190° C. and between 130° C. and 180° C. correspond to maximum temperature values reached by the mixture kneaded in the mixer during step a). Typically, the kneading during step a) is continued until the kneaded mixture reaches the maximum kneading temperature before being extracted from the mixer. The total duration of the kneading in step a) is preferably between 1 and 15 minutes. The mixture prepared at the end of step a) is recovered, then cooled in order to be able to proceed to step b) which is carried out at a lower temperature, in this case at a temperature below 110° C., preferentially between 40° C. and 100° C. Step b) is the step during which the sulfur and the primary accelerator are incorporated into the kneaded mixture comprising the elastomer, the reinforcing filler and the secondary accelerator. The incorporation of the sulfur and the primary accelerator into the rubber composition is typically carried out by kneading in an external mixer such as an open mill, generally for a time of between 2 and 15 minutes. The kneading in step b) is carried out at a temperature below 110° C., preferentially between 40° C. and 100° C.

The elastomer that is useful for the purposes of the invention is a highly saturated diene elastomer, which is preferably random, which comprises ethylene units resulting from the polymerization of ethylene. In a known way, the expression "ethylene unit" refers to the —(CH$_2$—CH$_2$)— unit resulting from the insertion of ethylene into the elastomer chain. The highly saturated diene elastomer is rich in ethylene units, since the ethylene units represent at least 50 mol % of all of the monomer units of the elastomer.

Preferably, the highly saturated diene elastomer comprises at least 60 mol % of ethylene units, particularly at least 65 mol % of ethylene units. In other words, the ethylene units preferentially represent at least 60 mol % of all of the monomer units of the highly saturated diene elastomer, particularly at least 65 mol % of all of the monomer units of the highly saturated diene elastomer. More particularly, the ethylene units represent at least 70 mol % of all of the monomer units of the highly saturated diene elastomer. Preferably, the ethylene units represent at least 90 mol % of all of the monomer units of the highly saturated diene elastomer. More preferentially, the ethylene units represent at most 85 mol % of all of the monomer units of the highly saturated diene elastomer. Advantageously, the highly saturated diene elastomer comprises from 60 mol % to 90 mol % of ethylene units, particularly from 65 mol % to 90 mol % of ethylene units, the molar percentage being calculated on the basis of all of the monomer units of the highly saturated diene elastomer. More advantageously, the highly saturated diene elastomer comprises from 60 mol % to 85 mol % of ethylene units, particularly from 65 mol % to 85 mol % of ethylene units, the molar percentage being calculated on the basis of all of the monomer units of the highly saturated diene elastomer. More particularly, the highly saturated diene elastomer comprises from 70 mol % to 85 mol % of ethylene units, the molar percentage being calculated on the basis of all of the monomer units of the highly saturated diene elastomer.

Since the highly saturated diene elastomer is a copolymer of ethylene and of a 1,3-diene, it also comprises 1,3-diene units resulting from the polymerization of a 1,3-diene. In a known manner, the term "1,3-diene unit" refers to units resulting from the insertion of the 1,3-diene via a 1,4 addition, a 1,2 addition or a 3,4 addition in the case of isoprene for example. The 1,3-diene units are those, for example, of a 1,3-diene containing 4 to 12 carbon atoms, such as 1,3-butadiene, isoprene, 1,3-pentadiene or an aryl-1,3-butadiene. Preferably the 1,3-diene is 1,3-butadiene or a mixture of 1,3-dienes, one of which is 1,3-butadiene. More preferentially, the 1,3-diene is 1,3-butadiene, in which case the highly saturated diene elastomer is a copolymer of ethylene and of 1,3-butadiene, which is preferably random.

The highly saturated diene elastomer can be obtained according to various synthesis methods known to those skilled in the art, notably as a function of the targeted microstructure of the highly saturated diene elastomer. Generally, it may be prepared by copolymerization at least of a 1,3-diene, preferably 1,3-butadiene, and of ethylene and according to known synthesis methods, in particular in the presence of a catalytic system comprising a metallocene complex. Mention may be made in this respect of catalytic systems based on metallocene complexes, which catalytic systems are described in documents EP 1 092 731, WO 2004035639, WO 2007054223 and WO 2007054224 in the name of the applicant. The highly saturated diene elastomer, including the case when it is random, may also be prepared via a process using a catalytic system of preformed type such as those described in documents WO 2017093654 A1, WO 2018020122 A1 and WO 2018020123 A1. Advantageously, the diene elastomer is random.

The highly saturated diene elastomer preferably contains units of formula (I) or units of formula (II).

-continued

 (II)

The presence of a saturated 6-membered ring unit, 1,2-cyclohexanediyl, of formula (I) in the copolymer may result from a series of very specific insertions of ethylene and/or 1,3-butadiene into the polymer chain during its growth. When the highly saturated diene elastomer comprises units of formula (I) or units of formula (II), the molar percentages of units of formula (I) and of units of formula (II) in the highly saturated diene elastomer, respectively o and p, preferably satisfy the following equation (eq. 1) or the equation (eq. 2), o and p being calculated on the basis of all the monomer units of the highly saturated diene elastomer.

$$0<o+p\leq30 \quad (eq.\ 1)$$

$$0<o+p<25 \quad (eq.\ 2)$$

The highly saturated diene elastomer may consist of a mixture of highly saturated diene elastomers which differ from each other by virtue of their microstructures or their macrostructures.

The content of the highly saturated diene elastomer in the rubber composition is at least 50 parts by weight per hundred parts of elastomer of the rubber composition (phr). Preferably, the content of the highly saturated diene elastomer in the rubber composition varies in a range extending from 80 to 100 phr. More preferentially, it varies in a range extending from 90 to 100 phr. It is advantageously 100 phr.

The rubber composition comprises a carbon black as reinforcing filler. Preferably, the carbon black represents more than 50%, preferentially more than 90% by weight of the reinforcing filler, in particular 100% by weight of the reinforcing filler. Suitable carbon blacks include all reinforcing carbon blacks, notably the blacks conventionally used in tires or their treads (known as tire-grade blacks). Among the latter, mention will be made more particularly of the reinforcing carbon blacks of the 100, 200 and 300 series, or the blacks of the 500, 600 or 700 series (ASTM grades), for instance the N115, N134, N234, N326, N330, N339, N347, N375, N550, N683 and N772 blacks. When the rubber composition in accordance with the invention is used in a tread, the carbon black is preferentially a carbon black of the 100 or 200 series.

The reinforcing filler may comprise any type of filler other than carbon black which is also known for its abilities to reinforce a rubber composition that can be used for the manufacture of tires, for example a reinforcing inorganic filler such as silica with which a coupling agent is combined in a known manner.

The content of carbon black in the rubber composition may vary to a large extent and is adjusted by a person skilled in the art according to the envisaged use of the rubber composition, in particular in the tire sector. The content of carbon black in the rubber composition is preferentially between 25 phr and 65 phr, in particular for a use of the rubber composition in a tread, in particular for vehicles intended to carry heavy loads. For such a use in the heavy goods vehicle sector, the rubber composition may exhibit an insufficient level of reinforcement for a content less than or equal to 25 phr and may exhibit excessive hysteresis for a content greater than or equal to 65 phr.

The vulcanizing system that is useful for the purposes of the invention has the essential characteristic of comprising sulfur and a vulcanization accelerator.

The sulfur is typically provided in the form of molecular sulfur or of a sulfur-donating agent, preferably in molecular form. Sulfur in molecular form is also referred to by the term "molecular sulfur". The term "sulfur donor" means any compound which releases sulfur atoms, optionally combined in the form of a polysulfide chain, which are capable of inserting into the polysulfide chains formed during the vulcanization and bridging the elastomer chains. The sulfur content in the rubber composition is preferentially less than 1 phr, preferably between 0.3 and 1 phr.

According to a more preferential embodiment of the invention, the sulfur content in the rubber composition is less than 0.95 phr, preferably between 0.3 phr and 0.95 phr.

According to an even more preferential embodiment of the invention, the sulfur content in the rubber composition is less than 0.8 phr, preferably between 0.3 phr and 0.8 phr.

The vulcanization accelerator is a mixture of a primary accelerator and of a secondary accelerator. The term "primary accelerator" denotes a single primary accelerator or a mixture of primary accelerators. Similarly, the term "secondary accelerator" denotes a single secondary accelerator or a mixture of secondary accelerators. By definition, the contents of primary accelerator and of secondary accelerator in the vulcanizing system are both strictly greater than 0 phr.

The primary accelerator is a sulfenamide. As examples of primary accelerators that are useful for the purposes of the invention, mention may preferentially be made of benzothiazolesulfenamides, notably N-cyclohexyl-2-benzothiazylsulfenamide ("CBS"), N,N-dicyclohexyl-2-benzothiazylsulfenamide ("DCBS"), N-tert-butyl-2-benzothiazylsulfenamide ("TBBS"), and mixtures of these compounds. The primary accelerator, in this case sulfenamide, is preferentially N-cyclohexyl-2-benzothiazylsulfenamide.

According to a first variant, the secondary accelerator is a thiuram polysulfide. According to a second variant, the secondary accelerator is a mixture of a thiuram polysulfide and a guanidine. A guanidine is understood to mean any compound which contains the divalent radical —HN—C(=NH)—NH—. The guanidine useful for the purposes of the invention is preferably diphenylguanidine.

Suitable thiuram polysulfides include in particular thiuram disulfides, more particularly tetraethylthiuram disulfide, tetrabutylthiuram disulfide ("TBTD"), tetrabenzylthiuram disulfide ("TBZTD") and mixtures of these compounds. The thiuram polysulfide is preferentially a thiuram disulfide, more preferentially tetrabenzylthiuram disulfide.

According to a preferred variant, the vulcanization accelerator is a mixture of a sulfenamide and a thiuram disulfide, more preferentially a mixture of N-cyclohexyl-2-benzothiazylsulfenamide and a thiuram disulfide, even more preferentially a mixture of N-cyclohexyl-2-benzothiazylsulfenamide and tetrabenzylthiuram disulfide.

According to another preferred variant, the vulcanization accelerator is preferentially a mixture of a sulfenamide, a thiuram disulfide and diphenylguanidine, more preferentially a mixture of N-cyclohexyl-2-benzothiazylsulfenamide, a thiuram disulfide and diphenylguanidine, even more preferentially a mixture of N-cyclohexyl benzothiazylsulfenamide, tetrabenzylthiuram disulfide and diphenylguanidine.

Preferably, the mass ratio between the amount of secondary accelerator and the total amount of accelerators is less than 0.7, the total amount of accelerators being the sum of the mass amount of primary accelerator and the mass amount of secondary accelerator in the rubber composition.

In other words, the mass content or mass amount of the secondary accelerator represents less than 70% by mass of the total amount of accelerators. Preferably, the mass ratio between the amount of secondary accelerator and the total amount of accelerators is greater than 0.05, more particularly between 0.05 and 0.7.

These preferential ranges relating to the mass ratios between the amount of secondary accelerator the total amount of accelerators make it possible to also improve the compromise between the cohesion properties and the press curing times by very greatly reducing the pressing time while at the same time maintaining good limit properties, even in the presence of a crack initiation site in the rubber composition.

According to a preferential embodiment, the mass ratio between the sulfur content and the total amount of accelerators in the rubber composition is less than 1, preferably less than or equal to 0.7, more preferentially less than 0.6. The use of such ratios makes it possible to obtain compositions with further improved cohesion properties.

According to a particularly preferential embodiment of the invention, the sulfur content in the rubber composition is less than 1 phr and the mass ratio between the sulfur content and the total amount of accelerators in the rubber composition is less than 1. This two-fold condition relating to the sulfur content and to the mass ratio between the sulfur content and the total amount of accelerators makes it possible to obtain compositions with even greater cohesion. The cohesion properties are all the more improved when the sulfur content and the mass ratio between the sulfur content and the total amount of accelerators are low and are notably in the preferential ranges mentioned previously for the sulfur content and for the mass ratio between the sulfur content and the total amount of accelerators.

The rubber composition may also comprise all or some of the usual additives customarily used in rubber compositions intended to be used in a tire, for instance in a tire tread. Such additives are, for example, processing agents, plasticizers, pigments, protective agents such as anti-ozone waxes, chemical anti-ozonants, antioxidants and vulcanisation activators. These additives are generally incorporated into the rubber composition before step b) of the process in accordance with the invention, for example during step a).

After step b) of the process, the rubber composition can be calendered or extruded, preferably to form all or part of a profile of a tread of a tire, in particular intended to equip a vehicle carrying heavy loads such as heavy-duty vehicles or construction plant vehicles.

The rubber composition manufactured according to the process in accordance is advantageously vulcanized, preferably at a temperature above 110° C., in particular after having been extruded or calendered in the form of a semi-finished article such as a tire tread.

In summary, the invention may be performed according to any one of the following embodiments 1 to 31:

Embodiment 1: Method for producing a rubber composition which comprises a highly saturated diene elastomer, a reinforcing filler comprising a carbon black and a vulcanizing system comprising sulfur and a vulcanization accelerator,
  the highly saturated diene elastomer being a copolymer of ethylene and of a 1,3-diene containing ethylene units which represent at least 50 mol % of the monomer units of the copolymer,
  the content of the highly saturated diene elastomer in the rubber composition being greater than 50 phr,
  the vulcanization accelerator being a mixture of a primary accelerator and of a secondary accelerator,
  the primary accelerator being a sulfenamide, the secondary accelerator being a thiuram polysulfide or a mixture of a thiuram polysulfide and a guanidine,
which process comprises a step a) followed by a step b):
  a) mixing the highly saturated diene elastomer, the reinforcing filler and the secondary accelerator by kneading at a temperature above 110° C., in the absence of the sulfur and the primary accelerator,
  b) incorporating the sulfur and the primary accelerator into the rubber composition by kneading at a temperature below 110° C.

Embodiment 2: Process according to embodiment 1, in which step a) is carried out at a temperature between 110° C. and 190° C.

Embodiment 3: Process according to embodiment 1 or 2, in which step a) is carried out at a temperature between 130° C. and 180° C.

Embodiment 4: Process according to any one of embodiments 1 to 3, in which step b) is carried out at a temperature between 40° C. and 100° C.

Embodiment 5: Process according to any one of embodiments 1 to 4, in which the highly saturated diene elastomer comprises at least 60 mol % of ethylene units.

Embodiment 6: Process according to any one of embodiments 1 to 5, in which the highly saturated diene elastomer comprises at least 65 mol % of ethylene units.

Embodiment 7: Process according to any one of embodiments 1 to 6, in which the highly saturated diene elastomer comprises at least 70 mol % of ethylene units.

Embodiment 8: Process according to any one of embodiments 1 to 7, in which the highly saturated diene elastomer comprises at most 90 mol % of ethylene units.

Embodiment 9: Process according to any one of embodiments 1 to 8, in which the highly saturated diene elastomer comprises at most 85 mol % of ethylene units.

Embodiment 10: Process according to any one of embodiments 1 to 9, in which the 1,3-diene is 1,3-butadiene or a mixture of 1,3-dienes, one of which is 1,3-butadiene.

Embodiment 11: Process according to any one of embodiments 1 to 10, in which the highly saturated diene elastomer comprises units of formula (I) or units of formula (II).

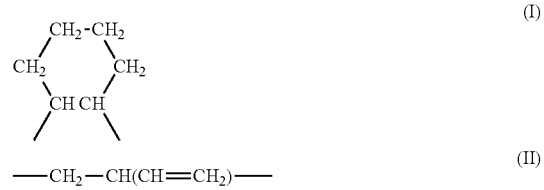

Embodiment 12: Process according to any one of embodiments 1 to 11, in which the molar percentages of the units of formula (I) and of the units of formula (II) in the highly saturated diene elastomer, respectively o and p, satisfy the following equation (eq. 1) or the equation (eq. 2), o and p being calculated on the basis of all the monomer units of the highly saturated diene elastomer.

$$0 < o+p \leq 30 \qquad (\text{eq. 1})$$

$$0 < o+p < 25 \qquad (\text{eq. 2})$$

Embodiment 13: Process according to any one of embodiments 1 to 12, in which the content of the highly saturated diene elastomer in the rubber composition varies within a range extending from 80 to 100 phr.

Embodiment 14: Process according to any one of embodiments 1 to 13, in which the content of the highly saturated diene elastomer in the rubber composition varies within a range extending from 90 to 100 phr.

Embodiment 15: Process according to any one of embodiments 1 to 14, in which the content of highly saturated diene elastomer in the rubber composition is 100 phr.

Embodiment 16: Process according to any one of embodiments 1 to 15, in which the carbon black represents more than 50% by weight of the reinforcing filler.

Embodiment 17: Process according to any one of embodiments 1 to 16, in which the carbon black represents more than 90% by weight of the reinforcing filler.

Embodiment 18: Process according to any one of embodiments 1 to 17, in which the content of carbon black in the rubber composition is between 25 phr and 65 phr.

Embodiment 19: Process according to any one of embodiments 1 to 18, in which the content of sulfur in the rubber composition is less than 1 phr, preferably between 0.3 and 1 phr.

Embodiment 20: Process according to any one of embodiments 1 to 19, in which the content of sulfur in the rubber composition is less than 0.95 phr, preferably between 0.3 phr and 0.95 phr.

Embodiment 21: Process according to any one of embodiments 1 to 20, in which the content of sulfur in the rubber composition is less than 0.8 phr, preferably between 0.3 phr and 0.8 phr.

Embodiment 22: Process according to any one of embodiments 1 to 21, in which the sulfenamide is a benzothiazolesulfenamide.

Embodiment 23: Process according to any one of embodiments 1 to 22, in which the sulfenamide is N-cyclohexyl-2-benzothiazylsulfenamide.

Embodiment 24: Process according to any one of embodiments 1 to 23, in which the guanidine is diphenylguanidine.

Embodiment 25: Process according to any one of embodiments 1 to 24, in which the thiuram polysulfide is a thiuram disulfide.

Embodiment 26: Process according to any one of embodiments 1 to 25, in which the thiuram polysulfide is tetrabenzylthiuram disulfide.

Embodiment 27: Process according to any one of embodiments 1 to 26, in which the mass ratio between the amount of secondary accelerator and the total amount of accelerators is less than 0.7, preferably is between 0.05 and 0.7, the total amount of accelerators being the sum of the mass amount of primary accelerator and the mass amount of secondary accelerator in the rubber composition.

Embodiment 28: Process according to any one of embodiments 1 to 27, in which the mass ratio between the sulfur content and the total amount of accelerators in the rubber composition is less than 1.

Embodiment 29: Process according to any one of embodiments 1 to 28, in which the mass ratio between the sulfur content and the total amount of accelerators in the rubber composition is less than or equal to 0.7, preferentially less than 0.6.

Embodiment 30: Process according to any one of embodiments 1 to 29, in which step b) is followed by a step of vulcanizing the rubber composition.

Embodiment 31: Process according to embodiment 30, in which the vulcanization step is carried out at a temperature above 110° C.

The abovementioned characteristics of the present invention, and also others, will be understood more clearly on reading the following description of the implementational examples of the invention, given by way of illustration and without limitation.

EXAMPLES

Tests and Measurements:
Determination of the microstructure of the elastomers:
The microstructure of the elastomers is determined by $^1$H NMR analysis, combined with $^{13}$C NMR analysis when the resolution of the $^1$H NMR spectra does not enable assignment and quantification of all the species. The measurements are performed using a Brüker 500 MHz NMR spectrometer at frequencies of 500.43 MHz for proton observation and 125.83 MHz for carbon observation.

For the insoluble elastomers which have the capacity of swelling in a solvent, a 4 mm z-grad HRMAS probe is used for proton and carbon observation in proton-decoupled mode. The spectra are acquired at rotational speeds of from 4000 Hz to 5000 Hz.

For the measurements on soluble elastomers, a liquid NMR probe is used for proton and carbon observation in proton-decoupled mode.

The preparation of the insoluble samples is performed in rotors filled with the analysed material and a deuterated solvent enabling swelling, generally deuterated chloroform ($CDCl_3$). The solvent used must always be deuterated and its chemical nature may be adapted by those skilled in the art. The amounts of material used are adjusted so as to obtain spectra of sufficient sensitivity and resolution.

The soluble samples are dissolved in a deuterated solvent (about 25 mg of elastomer in 1 ml), generally deuterated chloroform ($CDCl_3$). The solvent or solvent blend used must always be deuterated and its chemical nature may be adapted by those skilled in the art.

In both cases (soluble sample or swollen sample):
A 30° single pulse sequence is used for proton NMR. The spectral window is set to observe all of the resonance lines belonging to the analysed molecules. The number of accumulations is set so as to obtain a signal-to-noise ratio that is sufficient for quantification of each unit. The recycle delay between each pulse is adapted to obtain a quantitative measurement.

A 30° single pulse sequence is used for carbon NMR, with proton decoupling only during the acquisition to avoid nuclear Overhauser effects (NOE) and to remain quantitative. The spectral window is set to observe all of the resonance lines belonging to the analysed molecules. The number of accumulations is set so as to obtain a signal-to-noise ratio that is sufficient for quantification of each unit. The recycle delay between each pulse is adapted to obtain a quantitative measurement.

The NMR measurements are performed at 25° C.
Mooney viscosity:
The Mooney viscosity is measured using an oscillating consistometer as described in standard ASTM D1646 (1999). The measurement is carried out according to the following principle: the sample, analysed in the uncured state (i.e. before curing), is moulded (shaped) in a cylindrical chamber heated to a given temperature (100° C.). After preheating for 1 minute, the rotor rotates within the test specimen at 2 revolutions/minute and the working torque for maintaining this movement is measured after rotating for 4 minutes. The Mooney viscosity (ML) is expressed in "Mooney unit" (MU, with 1 MU=0.83 newton·metre).

Rheometry:

The measurements are performed at 150° C. with an oscillating-chamber rheometer, according to the standard DIN 53529—Part 3 (June 1983). The change in the rheometric torque as a function of the time describes the change in the stiffening of the composition as a result of the vulcanization reaction. The measurements are processed according to standard DIN 53529—part 2 (March 1983): ti is the induction period, that is to say the time necessary for the start of the vulcanization reaction; ta (for example t90) is the time necessary to achieve a conversion of a %, that is to say a % (for example 90%) of the difference between the minimum and maximum torques.

Fixation:

The measurements are taken at 130° C., in accordance with French standard NF T 43-005 (1991). The change in the consistometric index as a function of time makes it possible to determine the scorch time of the rubber compositions, which is assessed in accordance with the abovementioned standard by the parameter T5 (case of a large rotor), expressed in minutes, and defined as being the time necessary to obtain an increase in the consistometric index (expressed in MU) of 5 units above the minimum value measured for this index.

Losses:

The hysteresis losses, denoted by P60, are measured as percentage rebound on the sixth rebound at 60° C. in accordance with the standard ISO R17667.

Dynamic properties:

The dynamic properties, and more particularly the hysteresis tan δ(max), are measured on a viscosity analyser (Metravib VA4000) according to standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, under controlled temperature conditions (60° C.), is recorded. A strain amplitude sweep is carried out from 0.1% to 100% (outward cycle) and then from 100% to 1% (return cycle). The result made use of here is the loss factor tan δ. For the outward cycle, the maximum value of tan δ observed, denoted tan δ(max), is indicated.

Preparation of the rubber compositions:

Two rubber compositions C1 and C2, the details of the formulation of which appear in Table 1, were prepared according to the process in accordance with the invention for C1 and according to a conventional process not in accordance with the invention for C2.

Preparation of Composition C1:

Introduced successively into an internal mixer with a volume of 3300 cm$^3$ (final degree of filling: approximately 70% by volume), the initial vessel temperature of which is about 50° C., are the elastomer, the reinforcing filler, the secondary accelerators and also the various other ingredients, with the exception of the sulfur and the primary accelerator. Thermomechanical working (non-productive phase) is then carried out in one step, which lasts in total around 3 to 4 min, until a maximum "dropping" temperature of 160° C. is reached. The mixture thus obtained is recovered, it is cooled and then the sulfur and the primary accelerator are incorporated on an external mixer (open mill) at 30° C., everything being mixed (productive phase) for 10 minutes.

Preparation of Composition C2:

Introduced successively into an internal mixer with a volume of 3300 cm$^3$ (final degree of filling: approximately 70% by volume), the initial vessel temperature of which is about 50° C., are the elastomer, the reinforcing filler and also the various other ingredients, with the exception of the sulfur, the primary accelerator and the secondary accelerator. Thermomechanical working (non-productive phase) is then carried out in one step, which lasts in total around 3 to 4 min, until a maximum "dropping" temperature of 160° C. is reached. The mixture thus obtained is recovered, it is cooled and then the sulfur, the primary accelerator and the secondary accelerator are incorporated on an external mixer (open mill) at 30° C., everything being mixed (productive phase) for 10 minutes.

The compositions C1 and C2 thus obtained are subsequently calendered either in the form of slabs (thickness of 2 to 3 mm) or of thin sheets of rubber, for measurement of their physical or mechanical properties, or extruded in the form of a tire tread, and are then vulcanized.

The elastomer (EBR) is prepared according to the following procedure:

Added to a 70 L reactor containing methylcyclohexane (64 L), ethylene (5600 g) and 1,3-butadiene (2948 g) are butyloctylmagnesium (BOMAG) in solution in methylcyclohexane and the preformed catalyst. The Mg/Nd ratio is 6.2. The volume of preformed catalyst introduced is 840 mL, the concentration of the catalyst being 0.0065 M. The reaction temperature is regulated at a temperature of 80° C. and the polymerization reaction starts. The polymerization reaction takes place at a constant pressure of 8.3 bar. The reactor is fed throughout the polymerization with ethylene and 1,3-butadiene in the molar proportions 73/27. The polymerization reaction is halted by cooling, degassing of the reactor and addition of ethanol. An antioxidant is added to the polymer solution. The copolymer is recovered after steam stripping and drying to constant mass. The polymerization time is 225 minutes. The weighed mass (6.206 kg) makes it possible to determine the mean catalytic activity of the catalytic system, expressed in kilograms of polymer synthesized per mole of neodymium metal and per hour (kg/mol·h). The copolymer has an ML value equal to 62.

The catalytic system is a preformed catalytic system. It is prepared in methylcyclohexane from a metallocene, [Me$_2$Si(Flu)$_2$Nd(μ-BH$_4$)$_2$Li(THF)] at 0.0065 mol/l, a cocatalyst, butyloctylmagnesium (BOMAG), the BOMAG/Nd molar ratio of which is equal to 2.2, and a preformation monomer, 1,3-butadiene, the 1,3-butadiene/Nd molar ratio of which is equal to 90. The medium is heated at 80° C. over a period of 5 h. It is prepared according to a preparation method in accordance with paragraph 11.1 of patent application WO 2017093654 A1.

Results:

The results are given in Table 2. The results are expressed in base 100 relative to a control ([value of composition C1/value of composition C2]×100). A value greater than 100 indicates a value greater than that of the control.

The results show that composition C1 has lower hysteresis properties than composition C2. Specifically, the values of losses at 60° C. and of tan δ(max) are lower for C1 than for C2. This reduction in hysteresis is obtained owing to the introduction of the secondary accelerators during the non-productive phase and without there being any significant impact either on the vulcanization kinetics or on the scorch time. Indeed, as regards the scorch time, the induction time ti is 3.5 minutes for C1 versus 3.8 minutes for C2. As for the vulcanization kinetics, the values are almost similar.

Against all expectations, introducing the secondary accelerators during the non-productive phase makes it possible to reduce the hysteresis of vulcanized rubber compositions, reinforced with a carbon black and containing an elastomer which contains units of a conjugated diene and which is also rich in ethylene units.

TABLE 1

| Composition | C1 | C2 |
|---|---|---|
| EBR (1) | 100 | 100 |
| Carbon black (2) | 40 | 40 |
| Antioxidant (3) | 2 | 2 |
| Anti-ozone wax | 1 | 1 |
| Stearic acid (4) | 1.5 | 1.5 |
| ZnO (5) | 2.5 | 2.5 |
| Primary Accelerator (6) | 0.5 | 0.5 |
| Secondary Accelerator (7) | 0.8 | 0.8 |
| Sulfur | 0.4 | 0.4 |

(1) Copolymer containing 75 mol % of ethylene units, 7 mol % of 1,2-cyclohexanediyl units, 12 mol % of 1,2 units of the butadiene part, and 6 mol % of 1,4 units of the butadiene part
(2) N234
(3) N-(1,3-dimethylbutyl)-N'-phenyl-p-phenylenediamine ("Santoflex 6-PPD", Flexsys)
(4) "Pristerene 4931" stearin from Uniqema
(5) Zinc oxide of industrial grade from Umicore
(6) N-Cyclohexyl-2-benzothiazylsulfenamide, "Santocure CBS" from Flexsys
(7) Tetrabenzylthiuram disulfide (0.3 phr, "Perkacit TBZTD" from Flexsys) and diphenylguanidine (0.5 phr, "Perkacit DPG" from Flexsys)

TABLE 2

| Composition | C1 | C2 |
|---|---|---|
| ti at 150° C. | 92 | 100 |
| t90 at 150° C. | 102 | 100 |
| Fixation at 130° C. | 103 | 100 |
| P60 | 94 | 100 |
| tanδ(max) | 92 | 100 |

The invention claimed is:

1. A method for producing a rubber composition which comprises a highly saturated diene elastomer, a reinforcing filler comprising a carbon black and a vulcanizing system comprising sulfur and a vulcanization accelerator,
   the highly saturated diene elastomer being a copolymer of ethylene and of a 1,3-diene containing ethylene units which represent at least 50 mol % of the monomer units of the copolymer,
   the content of the highly saturated diene elastomer in the rubber composition being greater than 50 phr,
   the vulcanization accelerator being a mixture of a primary accelerator and of a secondary accelerator,
the primary accelerator being a sulfenamide, the secondary accelerator being a thiuram polysulfide or a mixture of a thiuram polysulfide and a guanidine,
which process comprises a step a) followed by a step b):

a) mixing the highly saturated diene elastomer, the reinforcing filler and the secondary accelerator by kneading at a temperature above 110° C., in the absence of the sulfur and the primary accelerator,
b) incorporating the sulfur and the primary accelerator into the rubber composition by kneading at a temperature below 110° C.

2. A process according to claim 1, in which step a) is carried out at a temperature between 110° C. and 190° C.

3. A process according to claim 1, in which step a) is carried out at a temperature between 130° C. and 180° C.

4. A process according to claim 1, in which step b) is carried out at a temperature between 40° C. and 100° C.

5. A process according to claim 1, in which the thiuram polysulfide is a thiuram disulfide.

6. A process according to claim 1, in which the guanidine is diphenylguanidine.

7. A process according to claim 1, in which the sulfenamide is a benzothiazolesulfenamide.

8. A process according to claim 1, in which the carbon black represents more than 50% by weight of the reinforcing filler.

9. A process according to claim 1, in which the carbon black represents more than 90% by weight of the reinforcing filler.

10. A process according to claim 1, in which the content of carbon black in the rubber composition is between 25 phr and 65 phr.

11. A process according to claim 1, in which the content of highly saturated diene elastomer in the rubber composition varies within a range extending from 80 to 100 phr.

12. A process according to claim 1, in which the 1,3-diene is 1,3-butadiene or a mixture of 1,3-dienes, one of which is 1,3-butadiene.

13. A process according to claim 1, in which the highly saturated diene elastomer comprises at least 60 mol % of ethylene units.

14. A process according to claim 1, in which the highly saturated diene elastomer comprises at most 90 mol % of ethylene units.

15. A process according to claim 1, in which step b) is followed by a step of vulcanizing the rubber composition.

16. A process according to claim 5, in which the thiuram polysulfide is tetrabenzylthiuram disulfide.

17. A process according to claim 7, in which the sulfenamide is N-cyclohexyl-2-benzothiazylsulfenamide.

18. A process according to claim 11, in which the content of highly saturated diene elastomer in the rubber composition varies within a range extending from 90 to 100 phr.

19. A process according to claim 1, in which the highly saturated diene elastomer comprises at least 70 mol % of ethylene units and at most 85 mol % of ethylene units.

20. A process according to claim 15, in which the step of vulcanizing the rubber composition is at a temperature above 110° C.

* * * * *